W. W. SCHIESL.
ANTIFRICTION JOURNAL BEARING.
APPLICATION FILED JULY 9, 1910.
1,092,174.
Patented Apr. 7, 1914.
2 SHEETS—SHEET 1.
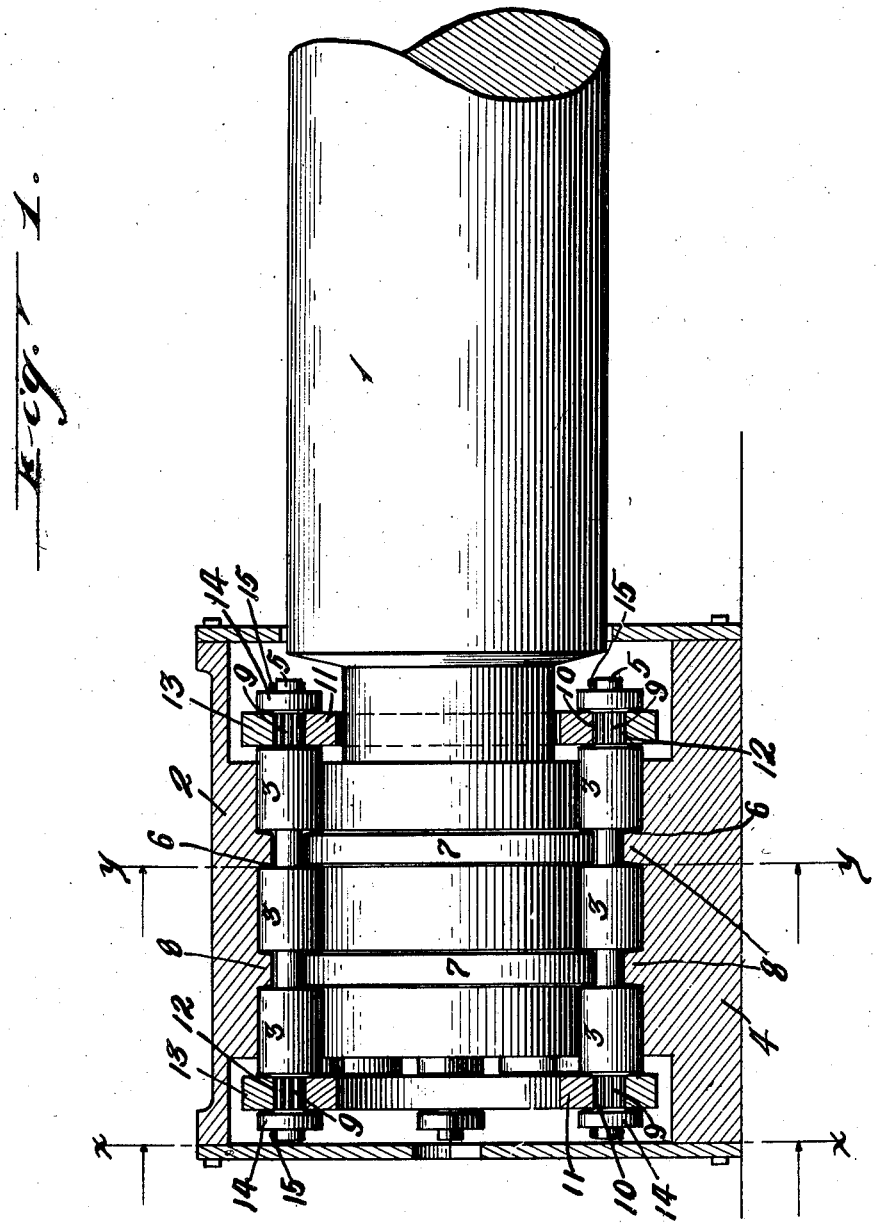

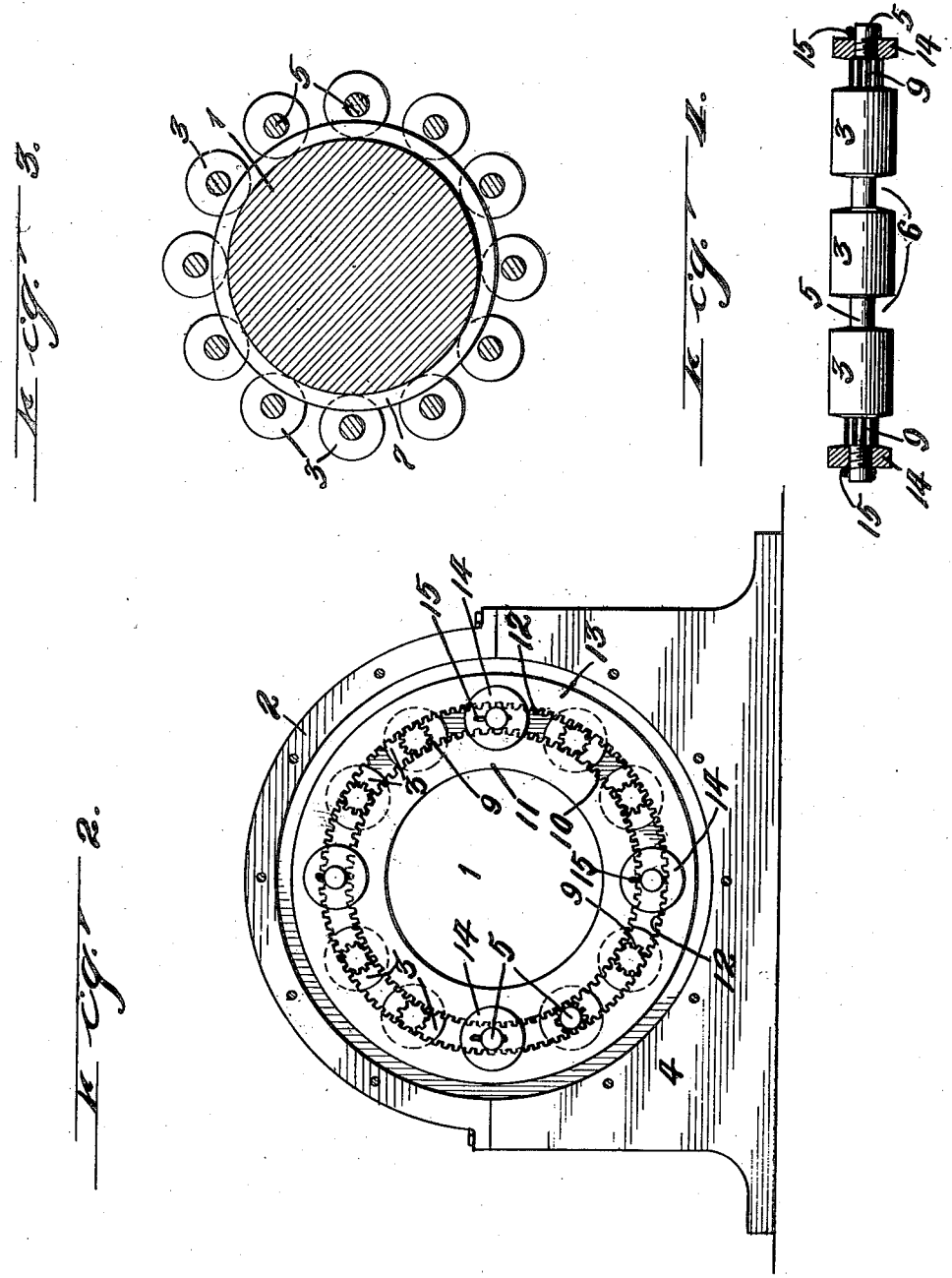

UNITED STATES PATENT OFFICE.

WILLIAM WOLFGANG SCHIESL, OF MILWAUKEE, WISCONSIN, ASSIGNOR OF ONE-FOURTH TO FRED SCHMITT, OF MILWAUKEE, WISCONSIN.

ANTIFRICTION JOURNAL-BEARING.

1,092,174.  Specification of Letters Patent.  Patented Apr. 7, 1914.

Application filed July 9, 1910. Serial No. 571,176.

*To all whom it may concern:*

Be it known that I, WILLIAM WOLFGANG SCHIESL, a citizen of the United States, residing at Milwaukee, county of Milwaukee, and State of Wisconsin, have invented new and useful Improvements in Antifriction Journal-Bearings, of which the following is a specification.

My invention relates to improvements in antifriction roller bearings for journals, and the same is explained by reference to the accompanying drawings, in which—

Figure 1 represents a side view, part in section. Fig. 2 is an end view. Fig. 3 is a detail showing an end view of the journal and the roller bearings thereon, and Fig. 4 represents a side view of one of the roller bearings removed from the shaft.

Like parts are identified by the same reference numerals throughout the several views.

1 represents one end of a shaft in connection with a journal box 2.

3 represents an annular series of bearing rollers which are supported around and upon the periphery of the journal.

4 represents the base member of the journal box upon the upper side of which the bearing rollers rest. The bearing rollers are preferably centrally supported upon the shaft 5 and are located at short intervals apart, the space between such bearings forming the annular channels 6 for the reception of the annular ribs 7 of the journal and the journal box is provided with inwardly projecting annular ribs 8, which are adapted to enter the annular channels 6 upon the opposite side of the roller bearings from the annular ribs 7 of the shaft. Thus it will be obvious that all longitudinal movements or end thrusts of the roller bearings 3 are resisted by the annular ribs 8, while the end thrust or longitudinal movements of the shaft 1 are resisted by contact of the annular ribs 7 with the ends of the roller bearings 3 within the annular channels 6, whereby said parts coöperate to retain the journal in place in the journal bearings.

The several roller bearings 3 are retained in their proper relative position to each other around the journal bearings by the pinions 9 coöperating with the collars 11 and 13, said shafts 5 being provided at their respective ends with one of said pinions and said pinions 9 are adapted to engage upon the inner sides with the annular series of gear teeth 10 of the collar 11 and upon their outer sides with the annular series of gear teeth 12 of the collar 13, and said collars 11 and 13 are retained in place on said pinions 9 by the collars 14, and collar retaining pins 15. The object of the pinions 9 and of the toothed collars 11 and 13 is to retain the roller bearings 3 at their proper distances apart around the journal bearings of the shaft, whereby said roller bearings are prevented from coming in contact with each other. It will be understood that the collars 11 and 13 are adapted to travel with the series of roller bearings 3 around and upon the journal box 2, as the shaft 1 is revolved.

While I have shown and described my invention as used in connection with the stationary journal box and revoluble shaft, it will be obvious that if desired the journal box and bearings may be located in the hub of a wheel which is adapted to operate upon a stationary shaft without materially departing from the spirit and purpose of my invention.

Having thus described my invention, what I claim as new, and desire to secure by Letters Patent, is—

In a device of the described class the combination of a journal box, a journal located in said box, an annular series of bearing rollers interposed between the periphery of said journal and journal box, two annular series of pinions, a pinion being supported from near the respective ends of each of said bearing rollers, two pairs of toothed collars carried by said pinions within and independently of said journal box, one pair of such collars being located at each end of the journal box, one collar of each pair being carried upon the exterior side of each series of pinions and the other collar upon the interior side of such series of pinions at the respective ends of the journal box, said collars being adapted to retain said bearing rollers at uniform distances around said journal and two annular series of collars, one collar being revolubly supported upon each end of each bearing roller, said collars being adapted to retain the toothed collars in place on said pinions, substantially as set forth.

In testimony whereof I affix my signature in the presence of two witnesses.

WILLIAM WOLFGANG SCHIESL.

Witnesses:
JAS. B. ERWIN,
LYMAN G. WHEELER.